Figure 1:
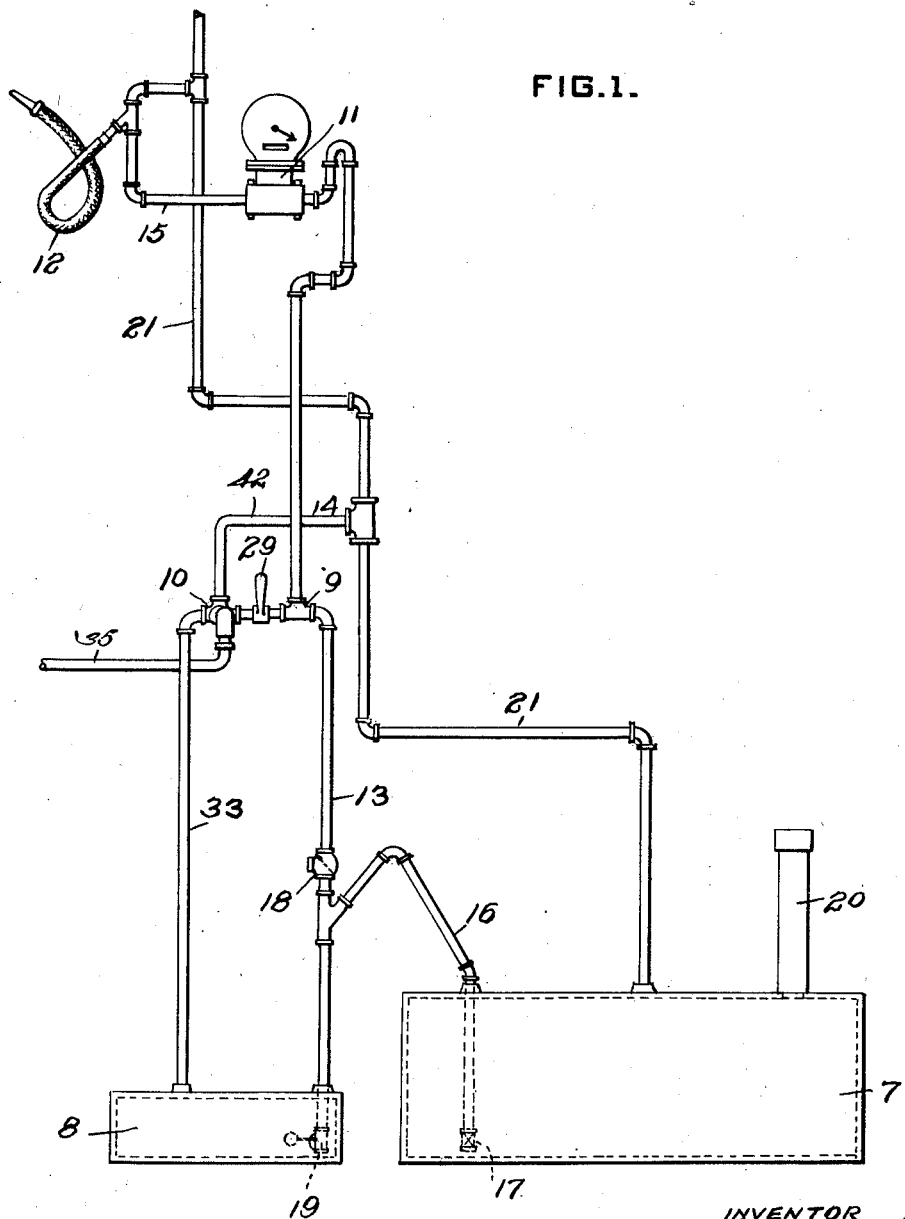

Dec. 15, 1925.　　　　　　　　　　　　　　1,565,794
T. C. CLIFFORD
FLUID DISTRIBUTING SYSTEM
Filed July 1, 1922　　　2 Sheets-Sheet 1

WITNESSES
J. Herbert Bradley.

INVENTOR
Thomas C. Clifford
By Green and McCallister
His Attorneys

Dec. 15, 1925.
T. C. CLIFFORD
1,565,794
FLUID DISTRIBUTING SYSTEM
Filed July 1, 1922  2 Sheets-Sheet 2
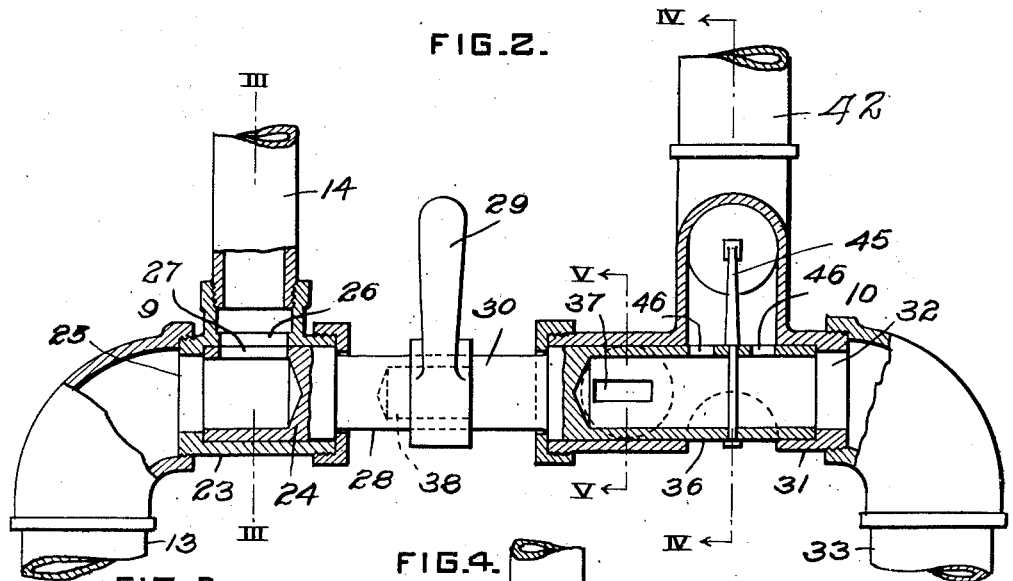
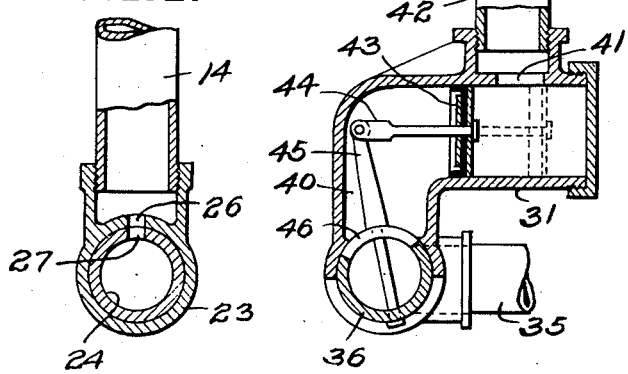
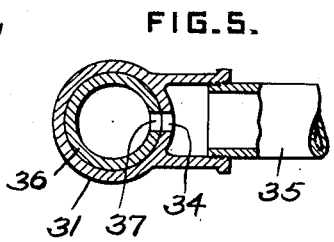
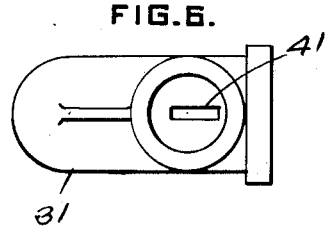
WITNESSES
J. Herbert Bradley.
INVENTOR
Thomas C. Clifford
By Green and McCallister
His Attorneys Patented Dec. 15, 1925.

1,565,794

UNITED STATES PATENT OFFICE.

THOMAS C. CLIFFORD, OF PITTSBURGH, PENNSYLVANIA.

FLUID-DISTRIBUTING SYSTEM.

Application filed July 1, 1922. Serial No. 572,268.

*To all whom it may conern:*

Be it known that I, THOMAS C. CLIFFORD, a citizen of the United States, and a resident of Pittsburgh, in the county of Allegheny and the State of Pennsylvania, have made a new and useful Invention in Fluid-Distributing Systems, of which the following is a specification.

This invention relates to liquid-dispensing systems and particularly to systems for dispensing inflammable or explosive liquids such as gasoline.

In such systems, it is usual to subject the liquid to be dispensed to air under pressure for the purpose of occasioning a flow through the system. It is, however, objectionable to maintain a continuous pressure on a body of inflammable liquid, such as gasoline, since the danger of storage is increased by such procedure. It is, therefore, desirable to subject a minimum amount of liquid only to pressure and also to release this pressure when the system is not being employed in dispensing liquid.

An object of the invention is to produce a system in which means are employed for subjecting a liquid-supply tank to fluid pressure for the purpose of delivering fluid through the system and in which simple and reliable means are employed for controlling both the delivery of liquid by the system and the fluid pressure within the system.

A further object is to produce a valve mechanism for controlling delivery of liquid through a liquid-dispensing system and the delivery of fluid under pressure to and the discharge of such fluid from the system, in which automatic means are employed for venting the system of fluid pressure as soon as the flow of liquid to be dispensed is cut off.

A further object is to produce simple and effective mechanism for accomplishing an immediate and positive control of the liquid and fluid under pressure within a fluid-dispensing system which is so arranged that no part of the system can be maintained under pressure except during the period that the operator is actually engaged in maintaining the control mechanism in a liquid delivering position.

These and other objects which will be made apparent throughout the further description of the invention are attained by means of apparatus embodying the features herein described and illustrated in the drawings accompanying and forming a part hereof.

In the drawings, Figure 1 is a digramatic view of a system embodying my invention. Fig. 2 is a sectional view illustrating air and liquid-delivery valves and the operating means therefor. Fig. 3 is a sectional view along the line III—III of Fig. 2. Fig. 4 is a sectional view along the line IV—IV of Fig. 2, and Fig. 5 is a sectional view along the line V—V of Fig. 2. Fig. 6 is a plan view of a portion of the apparatus illustrated in Figs. 2 and 4.

As illustrated in Fig. 1, the system includes a main storage tank or reservoir 7 which is preferably buried in the ground and a supplemental tank 8 which is preferably buried, and is adapted to receive liquid from the main tank 7. As shown, the bottom of the tank 8 is on a level with the bottom of the tank 7 and the two tanks are connected by means of piping which is so arranged as to form a siphon through which liquid is delivered from the main tank 7 to the supply tank 8.

The system also includes a liquid-control valve 9, a fluid-pressure control valve 10, a meter 11 and the usual flexible dispensing hose or pipe 12.

As shown, liquid is delivered from the tank 8 through piping 13, valve 9, piping 14, meter 11, piping 15 and the dispensing pipe 12. Liquid is delivered from the tank 7 to the tank 8 by means of piping 16 which communicates with the piping 13 in such a way as to form a siphon. A foot valve or check valve 17 is provided in the piping 16 for the purpose of preventing a back flow from the tank 8 to the tank 7. Piping 13 is provided with a check valve 18 at a point beyond the piping 16 for the purpose of preventing a back flow through the piping 13 and 14. A float-controlled valve 19 is also provided for the purpose of preventing the discharge of air under pressure through the liquid-delivery piping when the liquid in the tank 8 is abnormally low. Liquid is delivered from the tank 8 by means of fluid pressure, the delivery of which to the tank 8 is controlled by the valve 10.

The tank 7 is provided with the usual filling connection 20 and it is also provided with an air vent which communicates with the atmosphere through piping 21 which forms an atmospheric venting system for the entire dispensing system and, as is usual, is provided with a flame screen, not shown.

The liquid control valve 9 and the air or fluid pressure control valve 10 are interconnected so that they are operated simultaneously. As shown, the valve 9 consists of a casing 23 which encloses a rotary cylindrical valve plug 24 and which is provided with an inlet port 25 in open communication with the piping 13. It is also provided with a delivery port 26 in open communication with the piping 14. As shown the cylindrical plug 24 is in effect a Corliss valve and is hollow and its open end is in communication with the port 25 of the casing. It is provided with a peripheral port 27 which is adapted to be moved into and out of register with the port 26 when the valve is turned. A valve stem 28 is shown integrally formed with the plug 24 and projects laterally through the casing 23. It is operatively connected to a manually controlled handle 29 and a stem 30 forming a part of the fluid delivery valve 10.

The valve 10 is in some respects similar to the valve 9. It includes a casing 31, provided at one end with a fluid-delivery port 32 which is in open communication with piping 33 through which fluid such as air under pressure is adapted to be delivered to the tank 8. The casing 31 is also provided with an inlet port 34 which is in open communication with piping 35 through which air under pressure from a compressor or any other suitable source is delivered. A rotary cylindrical valve plug 36 operates within the casing 31 and is similar to the valve 24 in that it is shown as hollow. The open end of this valve is in open communication with the delivery port 32 of the casing and the valve is provided with a peripheral port 37 which is adapted to control the delivery of air under pressure to the tank 8 by being moved into and out of register with the port 34 of the casing. The stem 30 of this valve is operatively connected to the handle 29, and is also operatively connected with the stem 28 of the valve 24. As shown, the stem 28 is provided with an end socket into which a projection 38 of the stem 30 extends.

The casing 31 encloses a pressure chamber 40 which is provided with a vent port 41 in open communication with the venting system 21 through a pipe or passage 42. This port is controlled by means of a pressure-actuated piston 43 which is adapted to be moved with the valve plugs 24 and 36 to the position shown in Fig. 4, when the valve-delivery mechanism is in position for delivering liquid from the system.

As shown, the piston rod 44 of the piston 43 is operatively connected to the valve plug 36 by means of a lever 45 which is so arranged that the piston 43 is moved to cut off communication between the pressure chamber 40 and the vent port 41 when the plug 36 is moved to the position in which the peripheral port 37 registers or communicates with the fluid inlet port 34. The valve plug 36 is also provided with two peripheral ports 46 which are so arranged that the pressure chamber 40 is always in open communication with the piping 33 and consequently with the tank 8 independently of the position of the valve plug. With the arrangement illustrated, the piston 43 will prevent the venting of the air-dispensing system as long as the valves 9 and 10 are held in the liquid-delivering position by the operator, but as soon as the handle 29 is released, the air pressure within the system and consequently within the pressure chamber 40 will move the piston 43 to open the vent port 41 and this movement of the piston will also close both of the valves 9 and 10.

In Fig. 6, I have shown the arrangement and shape of the vent port and its position with relation to the travel of the piston 43 is illustrated in Fig. 4. It will be apparent that a port shaped and positioned substantially as illustrated will vent the system in such a way as to insure complete travel of the piston 43.

The ports 27 and 37 of the respective plugs 24 and 36 may be so located with reference to each other and with reference to their respective co-operating ports 26 and 34 that the flow of liquid will be cut off either before or after the air pressure is cut off to the system. I, however, prefer to so locate and arrange these ports that the air pressure is cut off and the system is at least partially vented before the flow of liquid from the tank is positively cut off by the co-operation of the ports 26 and 27. In establishing the flow of liquid, the handle 29 is moved from a vertical to an inclined position and in the preferable arrangement, communication is established between the ports 26 and 27 of the liquid control valve before communication is established between the ports 34 and 27 of the pressure control valve.

The operation of the apparatus is as follows:—When the handle 29 is turned by the operator to establish a flow of liquid from the tank 8 through the piping 13, 14, 15 and 12, the port 27 of the valve 9 registers with the port 26 of the casing of that valve and the port 37 of the valve 10 registers with the port 34 of the casing of that valve. Under such conditions, air under pressure is delivered through the valve plug 36 of the valve 10 and the piping 33 to the tank 8. This pressure forces liquid upwardly through the piping 13, valve 9 and piping 14 to the delivery piping 12. When the valve 29 is in the position described, the piston 43 is in the position illustrated in full lines in Fig. 4, thus cutting off communication between the interior of the valve 10 and the vent pipe 42. As soon as the handle 29 is released, the air pressure delivered through the pipe 35 and acting within the pressure chamber 40 shifts the piston 43 to the dotted line position of Fig. 4, thereby moving the port 27 out of register with the port 26 and cutting off the supply of liquid to the pipe 14 and also moving the port 37 out of register with the port 34 and cutting off the supply of air under pressure to the pipe 33. The moving piston 43 also places port 41 in communication with the chamber 40 and thereby vents that chamber and the pipe 33 to the atmosphere.

One of the features of my invention is the automatic closing of the valves 9 and 10 and the automatic venting of the system when the handle 29 is released by the operator. Another feature of the invention is the simplicity of the valve mechanism which is occasioned by the absence of springs, weights, etc. Another feature of the invention is that at the time of opening the valves the operator encounters no resistance whatever to the valve-opening movement, since the air pressure is not wholly effective until the valves 9 and 10 are fully opened. The principal feature of my invention is that the tank 8 is only subjected to super-atmospheric pressure while the gasoline or similar liquid is actually being delivered by the system. This is insured by the fact that not only the closing of the valves 9 and 10, but also the venting of the system is accomplished automatically.

While I have illustrated and described but one embodiment of my invention, it will be apparent to those skilled in the art, that various changes, additions, omissions and substitutions may be made in the apparatus illustrated, without departing from the spirit and scope of the invention as set forth by the appended claims.

What I claim is:—

1. In a liquid dispensing system, a liquid supply tank, a valve for controlling delivery of liquid from said tank, a valve for controlling delivery of fluid under pressure to said tank, and means responsive to fluid pressure delivered through said last mentioned valve for moving both of said valves.

2. In a liquid dispensing system, a liquid supply tank, a valve for controlling delivery of liquid from the tank, a valve for controlling delivery of fluid under pressure to and from the tank, an interconnecting operating mechanism for said valves, and means responsive to fluid pressure delivered by said fluid control valve for moving both said valves.

3. In a liquid dispensing system, a liquid supply tank, a valve for controlling the delivery of liquid from the tank, a valve for controlling the delivery of fluid under pressure to the tank, and means responsive to fluid under pressure delivered by said fluid control valve for moving said valve to cut off the fluid pressure to said tank.

4. In combination with a liquid dispensing system, a valve for controlling the delivery of liquid from said system, a fluid pressure control valve for controlling the delivery of fluid under pressure to said system, a single valve operating mechanism for said valves, and means responsive to fluid pressure within the system for actuating said valves to cut off the delivery of liquid and to vent said system.

5. In combination with a liquid dispensing system, axially aligned interconnected valves for separately controlling the delivery of air under pressure to and from the system, and the delivery of liquid to be dispensed and means responsive to air pressure within the system for venting the air pressure from the system and for cutting off the delivery of liquid from said system.

6. In combination with a liquid dispensing system, a valve for controlling the delivery of air under pressure to said system, and means subjected to pressure delivered by said valve for actuating said valve to cut off the supply of air under pressure to said system and to vent said system to the atmosphere.

7. In combination with a liquid dispensing system, a valve for controlling the delivery of air under pressure to said system, a valve for controlling the delivery of liquid from said system, an interconnecting operating mechanism for said valves, and manually restrained means responsive to fluid pressure within said system for venting said system and for actuating said valves to cut off the delivery of fluid under pressure to the system and the delivery of liquid from the system.

8. In combination in a fluid dispensing system, interconnected rotary valves for controlling the delivery of fluid under pressure to the system and the delivery of liquid from the system, a piston valve responsive to pressure within said system for controlling an atmospheric vent port with which the piston is provided, and operating connections between said piston valve and said rotary valves.

9. In combination in a fluid dispensing system, interconnected valves for controlling the delivery of fluid under pressure to said system and the delivery of liquid from said system, means for manually actuating said valves, a pressure responsive valve operatively connected to said interconnected valves and for controlling a vent port of said system and moving said interconnected valves to cut off the delivery of fluid under pressure to said system and the delivery of liquid from said system when said manually actuating means is released.

10. In combination in a fluid dispensing system, a valve mechanism for controlling the delivery of fluid under pressure to the system and the delivery of liquid from the system, manually operated means for controlling said valve mechanism, and fluid pressure operated means for automatically actuating said mechanism to cut off the fluid pressure to said system and to shut off the delivery of liquid from said system when said manually operated means is released by the operator.

11. In combination in a fluid dispensing system, a valve mechanism for controlling the delivery of fluid under pressure to the system and the delivery of liquid from the system, manually operated means for controlling said valve mechanism, and fluid actuated means for automatically actuating said mechanism to cut off the fluid pressure to said system and to shut off the delivery of liquid from said system and for venting said system of fluid pressure when said manually operated means is released.

12. In combination in a fluid dispensing system, a sleeve valve for controlling the delivery of liquid from the system, a sleeve valve for controlling the delivery of fluid under pressure to the system, manually operated means for controlling both of said valves, and automatic means for venting the system and for actuating the fluid control valve to shut off the supply of fluid under pressure to the system.

In testimony whereof, I have hereunto subscribed my name this 27th day of June, 1922.

THOMAS C. CLIFFORD.